United States Patent [19]
Wain

[11] 4,080,952
[45] Mar. 28, 1978

[54] RIM PUMP

[76] Inventor: Harry C. Wain, Hampden Rd., Somers, Conn. 06071

[21] Appl. No.: 745,380

[22] Filed: Nov. 26, 1976

[51] Int. Cl.² .............................................. B28D 1/04
[52] U.S. Cl. ..................................... 125/13 R; 51/267
[58] Field of Search .................. 125/12, 13 R; 51/267

[56] References Cited

U.S. PATENT DOCUMENTS

| | | | |
|---|---|---|---|
| 1,824,000 | 9/1931 | Walter | 125/13 R |
| 2,444,598 | 7/1948 | Eyles | 125/13 R |
| 2,991,599 | 7/1961 | Else | 51/267 |
| 3,127,886 | 4/1964 | Miller | 125/13 R |

*Primary Examiner*—Harold D. Whitehead

*Attorney, Agent, or Firm*—Prutzman, Hayes, Kalb & Chilton

[57] ABSTRACT

A lapidary saw is provided including a flat rotary blade having a circular peripheral cutting edge with the blade supported for rotation in an up-sawing angular direction for cutting a stone at a cutting station with an upward sweep of the saw. A bottom portion of the blade is continuously immersed in coolant contained within a reservoir, and a shroud is mounted to enclose a peripheral portion of the saw blade in underlying adjacent relation to the cutting station for positively discharging coolant, upon blade rotation, from an upper end of the shroud directly into the cut being made in the stone by the saw blade.

5 Claims, 4 Drawing Figures

RIM PUMP

This invention generally relates to lapidary saws for cutting precious or semi-precious stones and particularly concerns a cooling, lubricating and swarf flushing apparatus for such saws.

A primary object of this invention is to provide a new and improved apparatus for a lapidary saw for positively directing liquid coolant into a cut of a workpiece to effect significantly improved lubrication, cooling and swarf flushing.

Another object of this invention is to provide an apparatus of the type described particularly suited to effectively slab or cut very dense materials such as Brazilian agate and the like at speeds twice that achieved by known apparatus.

A further object of this invention is to provide such an apparatus which provides significantly improved cutting rates and further achieves seemingly incompatible objectives of simplifying and even eliminating conventional components commonly used for so-called coolant systems while providing improved cooling, lubricating and swarf flushing.

Other objects will be in part obvious and in part pointed out more in detail hereinafter.

A better understanding of this invention will be obtained from the following detailed description and the accompanying drawing of an illustrative application of this invention.

Figure 4:
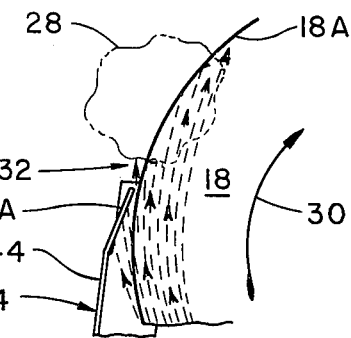
FIG. 4 is an enlarged view, partly broken away and partly in section, taken generally along line 4—4 of FIG. 2.

Referring now to the drawing in detail, a lapidary saw 10 is shown having a base 12 with a coolant reservoir 14 for containing a light cutting oil filled to a predetermined level 16 of reservoir 14. A carriage, not shown will be understood to be mounted on base 12 for securing and feeding a workpiece such as Brazilian agate or other type of precious or semi-precious stone or rock to be slabbed by the saw 10. The saw has a blade 18 fixed to a rotatable shaft 20 journaled on suitable bearings, not shown, with a pulley 22 secured to shaft 20 and driven by a belt 24 connected to a conventional electric motor 26. Specific details concerning the work supporting carriage, base 12 and the saw mounting arrangement have not been illustrated since such details are unnecessary for an understanding of this invention. Rather, it will be sufficient to understand that a workpiece, such as the stone shown in broken lines at 28 in FIG. 4 is secured to a vise, not shown, and which is mounted on the carriage to feed the stone 28 through saw 10 with the work supporting elements and the stone mounted for movement along a feed path above shaft 20 of blade 18 in noninterfering relation to its shaft 20. Saw blade 18 is shown as a flat metal circular member having a peripheral cutting edge 18A provided, e.g., with a metal matrix impregnated with abrasive particles such as diamonds.

Figure 1:
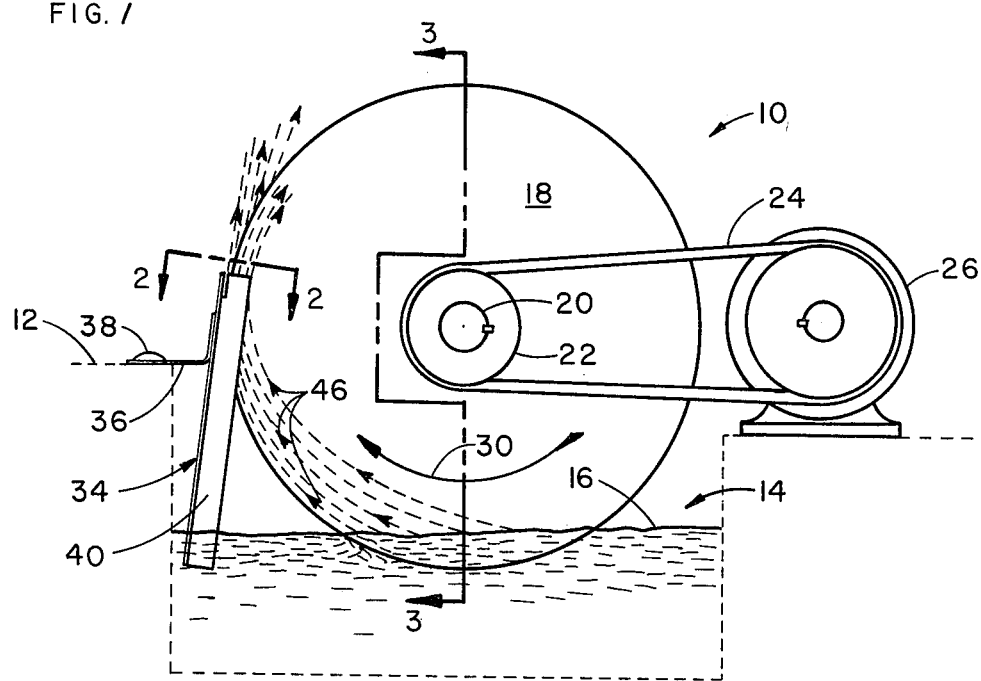
FIG. 1 is a side view schematically illustrating a lapidary saw incorporating this invention.

In accordance with one aspect of this invention, blade 18 is rotated in a selected angular direction as indicated by arrow 30 in FIGS. 1 and 4 to effect what is hereafter referred to as an "up-sawing" operation. I.e., contrary to more normally encountered practice, the actual sawing operation on stone 28 involves an upward sweep of the rim 18A of blade 18 in contact with stone 28 at a cutting station 32 located above blade drive shaft 20. A lower portion of blade 18 is intentionally immersed below oil level 16 in reservoir 14 such that a portion of each side surface of blade 18 is covered with coolant oil.

In accordance with this invention, a close fitting shroud 34 is mounted in adjacent underlying relation to cutting station 32 and in a position adjoining and enclosing a peripheral cutting edge of blade 18 in the flow path of the coolant swept upwardly by the rotating blade 18 emerging from reservoir 16. In the specifically illustrated embodiment, the shroud 34 is shown having a bracket 36 fixed by a conventional fastener 38 to base 12 of the lapidary saw 10. The shroud 34 itself may be formed of any suitable material such as sheet metal, e.g., to provide an elongated body of U-shaped cross section (FIG. 2) wherein a pair of longitudinally extending flanges 40, 42 project from opposite sides of a center web 44 with the flanges 40 and 42 contained in planes parallel to blade 18. Flanges 40, 42 are parallel and spaced apart a distance sufficient to permit upper free edges 40A, 42A (FIG. 2) of the flanges 40, 42 to be turned angularly inwardly toward one another to provide a converging outlet with upper free edges 40A, 42A of the flanges 40, 42 of the shroud 34 in closely spaced adjacent relation to blade 18 received between the flanges 40, 42. To further constrict the outlet if desired, an upper end 44A (FIG. 4) of the web 44 also may be turned inwardly toward the rim 18A of blade 18.

Upon operating the saw 10, its blade rotation through coolant in reservoir 16 wets blade 18 and forces coolant upwardly in streams clinging to both side surfaces of the rotating saw blade 18 which carry the coolant. Ambient air surrounding blade 18 serves to promote adhesion of the coolant to the blade 18. The coolant is shown at 46 in FIG. 1 being swept upwardly from reservoir 16 by the rotating saw blade 18 with the coolant being driven radially outwardly along the sides of blade 18 under the influence of centrifugal force. During operation, the blade 18 continuously imparts kinetic energy to the coolant and sweeps free streams of the coolant upwardly at a high velocity of approach toward the shroud 34 along opposite side surfaces of blade 18 in streams which lie in adjacent planes which are normal to the axis of rotation of the saw blade 18.

Figure 3:
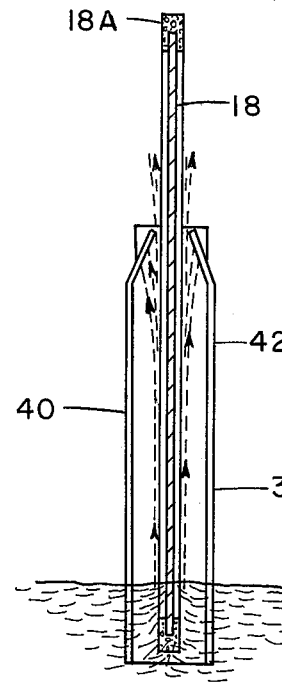
FIG. 3 is a section view taken generally along line 3—3 of FIG. 1.
Figure 2:
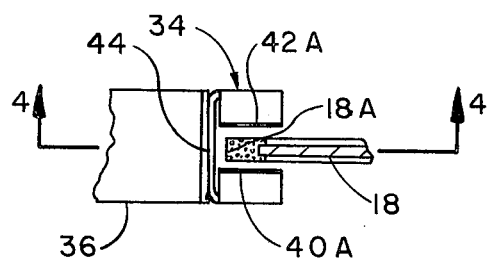
FIG. 2 is an enlarged view, partly broken away and partly in section, taken generally along line 2—2 of FIG. 1.

By virtue of the above described construction, the shroud 34 serves to enclose a peripheral portion of the saw blade 18 adjacent the cutting station 32 and provides an inlet for the coolant below the axis of rotation of the blade 18. The shroud 34 terminates in the reduced outlet at its discharge end formed by the converging free edges 40A, 42A of the flanges 40, 42 and, if desired by the inwardly turned end edge 44A of the web 44 which further constricts the outlet. The shroud 34 thus terminates in a discharge end more closely disposed to blade rim 18A than other parts of the shroud 34 to provide a flow passage of reduced cross section. I.e., the shroud 34 is provided a throat profiled as best seen in FIGS. 2 and 3, to form a converging cone in cross section whereby the discharge end of shroud 34 and blade 18 cooperate to jointly form a reduced flow nozzle at the outlet which in effect serves as a rim pump to discharge coolant with increased velocity into a cut in stone 28 at the cutting station 32 immediately adjacent and above shroud 34. The rim pump not only receives coolant swept up by the blade 18, but restrains portions of the coolant stream 46 from emerging radially from blade 18, as well as increasing coolant velocity upon passage through the outlet to actually discharge coolant directly into the cut of stone 28 substantially along its entire line of cut. Because of the high velocity of the coolant entering the cut, the oil serves as a coolant and additionally acts as a lubricant between the cutting edge 18A of blade 18 and stone 28 and provides the medium for swarf cleansing.

By virtue of this invention, the saw blade 18 runs through its enclosing shroud 34 and cooperates with the shroud 34 to force substantially all the coolant displaced by blade 18 from the reservoir 16 directly into the cut in the stone 28 with considerable impact force such that the cut is effectively cooled, lubricated and flushed. It has been found that with this invention Brazilian agates have been cut at rates of about one-half that time normally required by the use of conventional cutting apparatus. In addition to improvements in cooling, lubricating and flushing of the cut, the rim pump of this invention is significantly simplified in construction and in its reliability, for no cooling lines are required to be contended with, no pump motors need be installed and energized and no associated plumbing fittings are necessary to install, maintain and repair.

As will be apparent to persons skilled in the art, various modifications, adaptations and variations of the foregoing specific disclosure can be made without departing from the teachings of this invention.

I claim:

1. For use in a lapidary saw for sawing a cut in a stone at a cutting station, an apparatus comprising a base having a coolant reservoir, a saw blade operatively mounted on the base with a bottom portion of the blade immersed in coolant contained in the reservoir, power operated means for driving the saw blade in a selected direction to effect an up-sawing operation wherein the blade is driven from the reservoir with an upward movement through the cutting station, and a shroud surrounding the saw blade in the coolant flow path in underlying adjacent relation to the cutting station for positively directing coolant, driven by movement of the saw blade from the reservoir to the shroud, into a cut of the stone disposed in the cutting station above the shroud.

2. The apparatus of claim 1 wherein the shroud has an elongated body of U-shaped cross section having a web confronting the peripheral cutting edge of the blade and flanges projecting from opposite sides of the web in surrounding lapping relation to a peripheral portion of the saw, the shroud having an upper free end with the flanges of the shroud converging toward one another and receiving the saw blade therebetween, the converging ends of the shroud serving to provide a constricted discharge passage for coolant flow such that the shroud and the saw blade cooperate upon blade rotation to drive the coolant from its reservoir through the shroud and its discharge outlet into the cut in the stone to effectively lubricate, cool and flush swarf from the cut.

3. The apparatus of claim 2 wherein the web of the shroud has an upper end bent in a direction toward the peripheral cutting edge of the saw blade to further constrict the discharge outlet and define a reduced flow passage between the shroud and the blade serving as a flow nozzle.

4. The apparatus of claim 1 wherein the shroud includes a shroud supporting bracket and mounting means for attaching the bracket to the base for securing the shroud in operative position relative to the saw blade.

5. The apparatus of claim 1 wherein the saw blade is a flat rotary member having a circular cutting edge.

* * * * *